COMMUNICATION RECEIVER WITH NOISE BLANKING

Filed Aug. 3, 1962

INVENTORS:
ROBERT E. METZLER,
RICHARD T. MYERS,
BY I. David Blumenfeld
THEIR ATTORNEY.

United States Patent Office 3,140,445
Patented July 7, 1964

3,140,445
COMMUNICATION RECEIVER WITH NOISE BLANKING

Richard T. Myers and Robert E. Metzler, Lynchburg, Va., assignors to General Electric Company, a corporation of New York Filed Aug. 3, 1962, Ser. No. 214,587
10 Claims. (Cl. 325—478)

Figure 1:
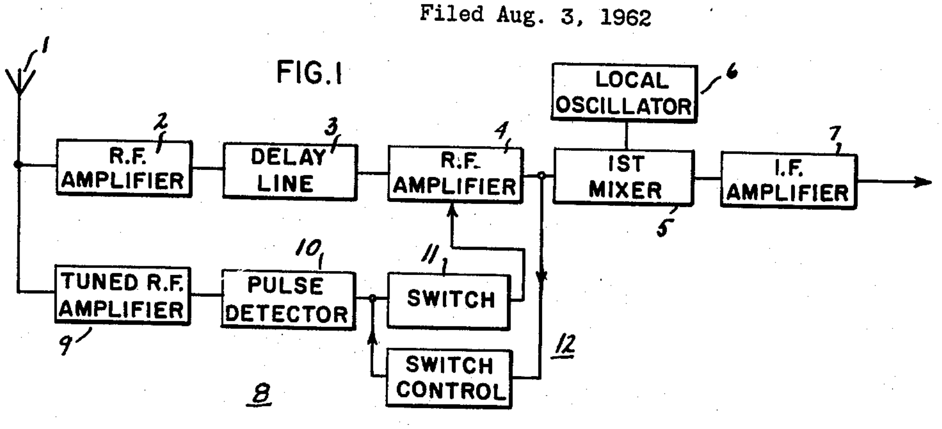

This invention relates to a communication receiver of the type which includes circuitry for selectively interrupting signal transmission in order to eliminate or "blank" impulse noise. More particularly, the invention relates to a receiver which includes further circuitry for disabling the noise blanking circuit whenever the conditions are such as to produce excessive blanking of the receiver.

In a concurrently filed patent application, Serial No. 214,650, filed on August 3, 1962, in the names of Richard T. Myers and Fred E. Spangler, and assigned to the assignee of the present invention, a communication receiver is described wherein the noise blanking system is automatically disabled under certain conditions in order to prevent excessive blanking of the receiver. As pointed out there, situations can arise, due either to a short intense burst of ignition or other impulses or to intermodulation in the blanking detector, in which the noise blanker interrupts transmission so often and for a sufficient length of time that signal reception in the receiver is seriously degraded. One solution for this problem is described there and includes control circuitry incorporated directly in the blanking channel for automatically disabling the channel by sensing the rate at which the blanking pulses are produced. That is, a control voltage proportional to the repetition rate of the blanking pulses is produced in the disabling means and this control voltage disables the blanking channel whenever the repetition rate of the blanking pulses exceeds a predetermined level. This circuit arrangement has been found to be eminently satisfactory for most purposes. Under some circumstances, however, it has been found that a greater degree of sensitivity and a much wider latitude in operation may be achieved if the control circuit for disabling the noise blanker channel is actuated in response to conditions in the signal transmission channel of the receiver as a stage thereof is blanked.

It is, therefore, one of the principal objectives of this invention to provide a receiver having noise blanking circuitry for preventing the passage of impulse noise in the receiver which includes control circuitry for disabling the blanker automatically in response to the rate at which the main signal transmission channel is blanked;

Another objective of this invention is to provide a receiver having a noise blanking circuit arrangement which is automatically disabled by sensing the operating conditions at the stage of the receiver being blanked;

Other objectives and advantages of the instant invention will become apparent as the description thereof proceeds.

In accordance with the invention, the foregoing objectives are achieved by providing a communication receiver which includes an auxiliary noise blanking circuit wherein noise impulses are amplified, detected, and converted to blanking pulses of suitable polarity. These blanking pulses are applied to the signal transmission path of a receiver, preferably one of the R.F. amplifier stages, to bias these receiver stages into cut-off to prevent passage of the noise impulses. In addition, circuitry is provided for automatically disabling the blanker channel whenever the blanking rate becomes excessive. To this end, a feedback and control circuit is provided which senses the change in voltage levels at the R.F. amplifier stage as the stage switches between the conducting and nonconducting state in response to blanking pulses. This circuit produces a control signal which is proportional to the rate at which the stages are blanked. Whenever the blanking rate, whether due to ignition noise or to an intermodulation "beat" frequency, exceeds the predetermined rate, the control signal becomes sufficiently large to disable the blanking circuit, thereby terminating further interruption of the receiver signal transmission path.

Figure 2:
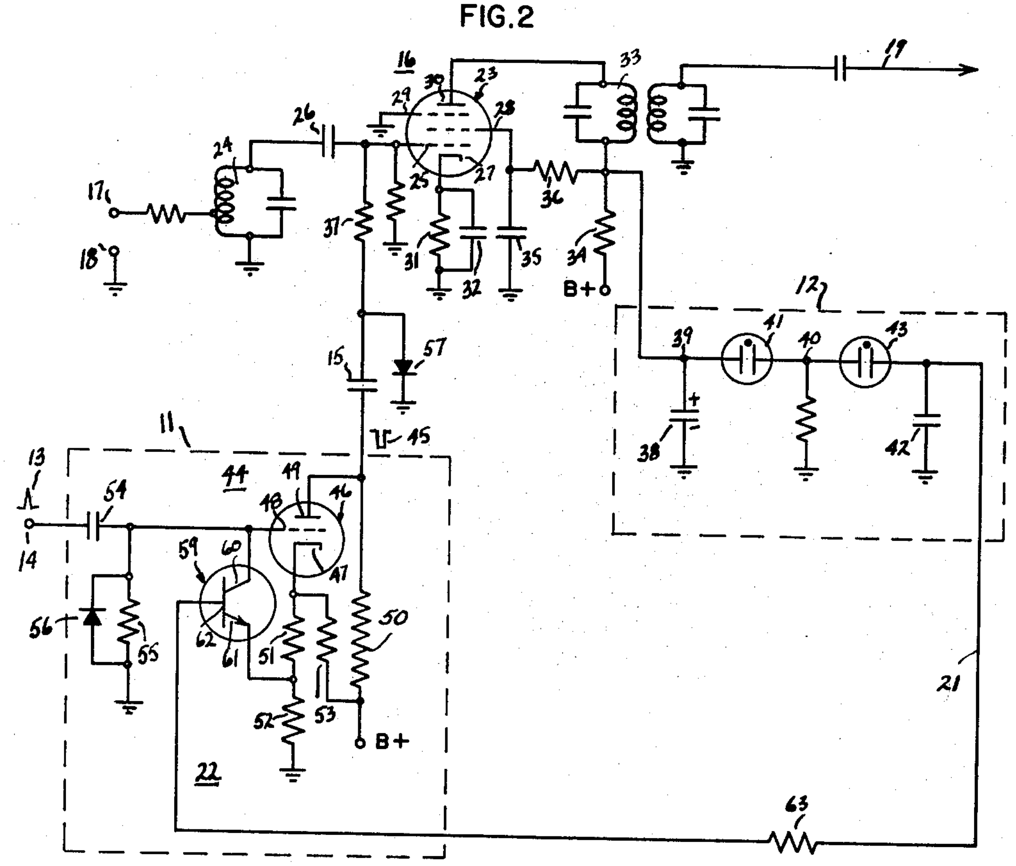

The novel features which are believed to be characteristic of this invention are set forth with particularity in the appended claims. The invention itself, both as to its organization and method of operation, together with further objects and advantages thereof, may best be understood by reference to the following description taken in connection with the accompanying drawings in which:

FIG. 1 is a block diagram of the front end of a communication receiver constructed in accordance with the invention; and FIG. 2 is a circuit diagram illustrating a portion of the receiver, the noise blanker and the noise blanking disabling circuit.

FIGURE 1 illustrates in block diagram form the front end of a typical double conversion, super-heterodyne, communication receiver constructed in accordance with the invention. The communication receiver includes a noise blanking channel and an arrangement for automatically disabling the noise blanking channel by sensing the rate at which one of the stages in the signal transmission path of the receiver is blanked. The signal at receiver antenna 1 is amplified in one or more ratio frequency (R.F.) amplifier stages 2. The amplified signal may, if desired, to be passed through a delay line 3 in order to synchronize the receiver blanking pulses with the noise impulses in the signal transmission path. That is, the blanking pulse must be synchronized with each noise impulse in order to make sure that the R.F. amplifier is blanked at the precise moment the noise pulse passes through. Hence, suitable delay must occur in the R.F. amplifiers in the transmission channel of the receiver. In receivers with high R.F. selectivity, i.e., very narrow band tuned circuits, the tuned circuits provide the necessary delay in the noise impulse to synchronize it with the blanking pulse. For those receivers with relatively low R.F. selectivity, a delay line such as illustrated at 3 may be added to provide desired synchronization.

The signal is amplified further in one or more radio frequency (R.F.) amplifying stages 4 and is impressed on the input of a first mixer 5 along with the signal from local oscillator 6. The amplified signal is converted in mixer 5 to a first intermediate frequency (I.F.) signal which may, for example, be 8 megacycles. The first I.F. signal is then applied to one or more I.F. amplifier stages 7 and from there to the remaining stages of the receiver, not shown, which typically include a second mixer to convert the signal to a second I.F. frequency (such as 455 kc.), further I.F. amplifiers, limiters, and thence to a detector and the audio output stages of the receiver. It will be apparent as the description of this invention proceeds, that the novel noise blanker and noise blanker disabling circuit, presently to be described, may be utilized with communication receivers of many types and is by no means limited to a super-heterodyne, double conversion F.M. receiver.

As was pointed out previously, various types of noise impulses, such as those generated by the ignition systems of automobiles, for example, must be prevented from passing through the receiver since these noise impulses are stretched substantially in passing through the highly selective tuned circuits of the receiver I.F. stages and appear as interfering noise output at the speaker. To this end, the received signal at antenna 1 is simultaneously applied to a noise blanking channel shown generally at 8 wherein the noise pulses are detected and utilized to produce a blanking pulse which disables one or more stages of the R.F. amplifier 4 in the receiver signal transmission path. This "blanking" occurs at the precise instant when the noise pulse is about to pass through the amplifier, thereby preventing passage of the impulse to the remaining stages of the receiver.

Noise blanking channel 8 contains one or more R.F amplifier stages shown generally at 9 wherein the signal and the noise impulses received at the antenna are amplified sufficiently to insure detection in a pulse detecting circuit illustrated generally at 10. Pulse detector 10 may be any suitable known pulse detecting circuit. For example, in the case of an F.M. receiver, pulse detector 10 may typically be an envelope detector, comprising a combination of a semiconductor diode and a filter or bypass capacitor, which is capable of detecting any sudden amplitude variations in the carrier and converting them into positive pulses which appear at the output of detector 10. The positive pulses are impressed on a noise blanking switch 11 which produces a negative blanking pulse applied to amplifier stages 4 to bias them into cut-off.

Blanking switch 11 may consist of any suitable combination of circuitry to produce a blanking pulse of the proper polarity, duration, amplitude and shape to bias one of the amplifier stages into cut-off. In the specific switch circuit to be described below, the switch consists of a pulse amplifier, and pulse shaping circuitry to produce the desired blanking pulse from the detected noise pulses at the output of detector 10. It will be understood, however, that the instant invention is not limited to any particular circuitry for producing or shaping the blanking pulse.

As was pointed out above, it is necessary to prevent excessive blanking of the receiver by providing circuitry for disabling noise blanker channel 8 in the event that the blanking rate, whether due to a high incidence of ignition impulses or due to intermodulation problems, exceeds a predetermined value. To this end, a blanking switch control circuit 12 in the form of a feedback loop is coupled between the output of R.F. amplifier stages 4 and the input of noise blanking switch 11. Switch control circuit 12 includes means for sensing the condition at the output of R.F. amplifier 4 as those amplifier stages are switched from the conducting to the nonconducting state and for producing a control voltage in response to the rate at which the amplifier stages are blanked. Whenever the repetition rate of the pulses exceeds a predetermined value, the amplitude of the control signal becomes sufficiently large to disable the blanking switch thereby terminating further interruption of the receiver signal transmission path. The precise characteristics and circuit configuration of the switch control feedback loop will be explained in connection with FIG. 2 of the drawings. However, it will be understood that any type of circuitry which produces a control signal proportional to the rate at which the R.F. amplifier stages are blanked, is suitable for use in the novel communication receiver embodying the instant invention.

FIG. 2 illustrates a preferred form of the blanking switch and the blanking switch feedback control circuit which may be utilized in the receiver illustrated in FIG. 1. The positive detected pulses 13 from pulse detector 10 are impressed on an input terminal 14 of the switch 11. The output blanking pulses are coupled through a coupling capacitor 15 to the control grid of a tuned R.F. amplifier shown generally at 16 which forms one of the stages of the R.F. amplifier 4 of FIG. 1. The signal from the antenna and the preceeding R.F. amplifier stages is impressed across amplifier input terminals 17 and 18, is amplified further and applied over output lead 19 to the remaining stages of the receiver. The appearance of a blanking pulse from switch 11 drives R.F. amplifier 16 into cut-off, thereby preventing passage of the signal and of the noise impulse superimposed thereon to the remaining portion of the receiver. The duration of the blanking pulse is so short, 10 microseconds ($\mu$sec.) or less, that the loss of signal during blanking does not affect the intelligibility of the signal. The tuned circuits in the further stages of the receiver have a sufficiently high quality factor Q that they act as storage circuits similar to a "flywheel" and supply energy during the blanked interval. Thus, under normal conditions and at normal blanking rates, blanking of the receiver does not cause any perceptible or series loss of intelligibility.

Coupled to the output of the R.F. amplifier 16 is a switch control circuit illustrated generally at 12, presently to be described, which senses the condition of the amplifier 16 and produces in response thereto a control voltage the amplitude of which is proportional to the rate at which R.F. amplifier 16 is blanked. This control voltage is coupled by means of a suitable lead 21 to a solid state transistor switch 22 which disables blanking switch 11 whenever the rate at which R.F. amplifier 16 is blanked becomes excessive.

Amplifier stage 16 includes a tuned plate-tuned grid R.F. pentode amplifier 23, having a tuned input circuit 24 connected to control grid 25 of pentode 23 through a coupling capacitor 26. Pentode 23 includes, in addition to control grid 25, a cathode 27, a screen grid 28, a suppressor grid 29 and an anode 30. Cathode 27 is connected to a point of reference potential such as ground through a cathode resistor 31 bypassed for A.C. by a suitable capacitor 32. Anode 30 is connected through a tuned output circuit 33 and anode resistance 34 to the positive terminal B+ of a source of unidirectional energizing voltage. Screen grid 28 is bypassed for A.C. by means of a bypass capacitor 35 and is connected to anode resistance 34 by the screen dropping resistance 36. The combination of anode resistance 34 and screen dropping resistance 36 forms a voltage divider which supplies a positive D.C. biasing voltage to screen grid 28. Suppressor grid 29 is connected directly to ground for the usual purpose of suppressing secondary emission from the anode. Conduction of pentode 23 is controlled by blanking pulses from switch 11 which are applied to the control grid 25 through coupling capacitor 15 and the grid coupling resistance 37. It will be appreciated that the negative going blanking pulse applies sufficient negative bias to control grid 25 to drive pentode 23 to cut-off for the duration of the blanking pulse.

The voltage sensing circuit in switch control circuit 12 senses the change in anode voltage each time the amplifier is blanked to produce a control voltage which is proportional to the blanking rate. The sensing circuit in switch control circuit 12 includes a first storage capacitor 38 which is connected to the junction 39 of anode resistance 34 and tuned circuit 33 and is charged to the polarity indicated. The voltage at the junction 39 is proportional to the rate at which amplifier 16 is blanked by switch 11. Each time the amplifier is blanked, the anode voltage rises towards B+ and storage capacitor 38 charges towards this voltage through anode resistance 34. The R–C charging time is greater than the duration of the blanking pulses so that capacitor 38 cannot charge to the full B+ voltage, but it is sufficiently low to permit the capacitor to charge to a substantial fraction of the B+ voltage. During the interval between blanking pulses pentode 23 conducts and its anode voltage drops to a low value and capacitor 38 discharges toward the low value of anode voltage through pentode 23. The R–C discharge time of capacitor 38 is, therefore, essentially determined by the plate resistance of pentode 23. Since the plate resistance of a pentode is quite high, on the order of several hundred thousand ohms, the R–C discharge time of storage capacitor 38 is substantially larger than the charging time and under normal conditions the voltage on capacitor 38 does not decay fully to the lower value of the anode voltage of pentode 23 before the next blanking pulse but discharges to a level depending on the time interval between blanking pulses. The greater the interval between the blanking pulses, the greater the decay of voltage on capacitor 38 and the lower the level of the average voltage on capacitor 38. Conversely, the smaller the interval between blanking pulses the higher the level of the average voltage on capacitor 38.

A voltage reference element 41 is coupled between junction 39 and a second reference point 40. The reference element reduces the voltage at point 39 by a fixed amount so that the voltage variations at point 40 track the voltage variations on capacitor 38 but at a lower level. Voltage reference element 41 is a gas discharge device such as a neon glow tube which is characterized by the fact that below a predetermined voltage level, referred to as "ionization potential," the tube is in a nonconducting state. Whenever the ionization potential is exceeded the gas is ionized producing current flow and a fixed voltage drop across the gas tube which remains constant over a wide range of applied voltages. After ionization has started, the action maintains itself at a voltage lower than the ionization potential or firing point. However, a minimum voltage exists which is needed to maintain ionization. If the voltage across the tube falls below this minimum "de-ionization potential" or "extinction potential," the gas de-ionizes and conduction stops. Thus these devices may be used both as electronic switches, which close at a certain voltage and open at some lower voltage, or as voltage reference elements which establish a fixed voltage drop. In the instant circuit, tube 41 is used as a voltage reference element since the potential at point 39 is always sufficiently high to maintain the neon glow lamp 41 in an ionized condition. Hence the potential at point 40 varies in synchronism with the potential variations at point 39.

A voltage sensitive switch device 43 of the neon glow lamp type is coupled between point 40 and a second storage capacitor 42 and is maintained in a nonconducting state until the potentials at points 39 and 40 reach predetermined values. Whenever the potential at point 39 exceeds a predetermined value, which in turn depends on the rate at which amplifier 16 is blanked, the potential at point 40 rises sufficiently to exceed the ionization potential of neon glow tube 43 causing it to conduct and charging capacitor 42 to the polarity indicated on FIG. 2. Capacitor 42 is of extremely small value, on the order of 20 picofarads or so, and as a result, capacitor 42 charges almost instantaneously to the value of the voltage at point 40 less the drop across tube 43. The voltage on capacitor 42 is utilized as a control voltage to disable blanking switch 11 thereby preventing its further operation.

Blanking switch 11 includes a pulse amplifier shown generally at 44, pulse shaping circuitry for producing blanking pulses 45, and a switch 22 which is actuated by the control voltage from sensing means 20 to bypass input pulses 13 to ground thereby disabling the switch. Pulse amplifier 44 includes a vacuum triode 46 having a cathode 47, a control grid 48 and an anode 49. Anode 49 is connected to the positive terminal B+ of a suitable source of unidirectional energizing voltage through an anode resistance 50 and to the control grid of amplifier 16 through the coupling capacitor 15 and the resistance 37. Cathode 47 is connected directly to ground through series connected resistors 51 and 52, and to B+ through resistance 53. Resistors 51, 52 and 53 form a voltage dividing network and their values are such that the voltage at the cathode is maintained slightly positive with respect to ground, i.e., resistance 53 is very large with respect to the resistances 51 and hence the major part of the voltage drop takes place across this resistance.

The incoming positive pulses 13 are applied to control grid 48 through the combination of coupling capacitor 54 and grid leak resistance 55. A limiting or clipping diode 56 which forms part of the pulse shaping network shunts grid leak resistance 55 and is poled to limit or clip any negative going excursions of the incoming pulses 13. Triode 46 is normally biased for Class C operation and each positive going pulse 13 drives the triode into saturation producing a negative rectangular pulse 45 at anode 49. Coupled to the junction of capacitor 15 and resistance 37 is another limiting or clipping diode 57 poled to shunt to ground any positive going excursions of negative blanking pulse 45. The combination of clipping diodes 56 and 57 function in conjunction with their associated resistance and capacitive components to shape the input and blanking pulses to produce the desired rectangular negative blanking pulse for driving R.F. amplifier 16 into cut-off and preventing passage of the noise impulses to the rest of the receiver.

Amplifier 44 is periodically disabled in response to the control voltage appearing at the output of the sensing means in switch control circuit 12 by a solid state switch element 22 which when actuated shunts or bypasses the incoming positive pulses 13 to ground. To this end, the collector-emitter resistance of an NPN transistor 59 is connected between control grid 48 and the junction of cathode resistances 51 and 52. Transistor 59 includes a collector 60 connected directly to control grid 48, an emitter 61 connected to the junction of cathode resistances 51 and 52, and a base 62 connected through a current limiting resistor 63 to capacitor 42. Under normal conditions, with capacitor 42 in the uncharged state, base 62 is at zero or ground potential, whereas emitter 61 is maintained at a slightly positive potential with respect to ground by virtue of the voltage drop across cathode resistor 52. The base-emitter junction of transistor 59 is thus reverse biased, the transistor is in the nonconducting state and the collector-emitter resistance of the device is extremely high. Transistor switch 59 acts as an open circuit between the control grid 48 and the cathode 47 of triode 46 and does not affect the incoming pulses.

Whenever voltage sensitive neon glow tube switch 43 in the sensing circuit of switch control circuit 12 conducts, a positive control voltage is established across capacitor 42 and base 62 of transistor 59 becomes positive with respect to emitter 61 and collector 60, forward biasing both transistor junctions and driving the transistor into saturation. As transistor 59 is driven into saturation, the collector-emitter resistance drops to a very low value, in the order of several hundred ohms or so, and presents essentially a short circuit to the incoming pulses 13, diverting these pulses from control grid 48 to ground. As a result, no further negative blanking pulses 45 are applied to R.F. amplifier 16 terminating the blanking of the receiver. As soon as the voltage on capacitor 42 disappears, transistor 59 is again driven into cut-off and the collector-emitter resistance rises sufficiently to permit normal operation of the blanking switch. The sensing circuit continues to perform its function and sense the conditions at the output of R.F amplifier 16 and if the repetition rate of the noise pulses, and hence of the blanking pulses, still exceeds a predetermined value, glow tube 43 again breaks down charging capacitor 42 to a positive potential thereby operating solid state switch 22 and disabling blanking switch 11.

The operation of the blanking switch and switch control arrangement illustrated in FIG. 2 may best be understood in view of the following description: When the receiver is first turned on, R.F amplifier 16 is conducting and biased for Class A operation. Since pentode 23 is conducting, the voltage at the junction of anode resistance 34 and tuned circuit 33 is substantially lower than the B+ supply voltage by virtue of the voltage drop across the anode resistance. Control storage capacitor 38 of the sensing means in switch control circuit 12 charges up to this low value of anode voltage. The voltage level on capacitor 38 may be considered as the base or minimum level $V_B$ to which capacitor 38 is charged. This base level is sufficiently high to exceed the ionization potential of the neon tube reference element 41 which then conducts producing a voltage $V_O$ at point 40 which is equal to the base voltage level $V_B$ less the voltage drop across the neon tube, i.e. $V_O=V_B=V_K$. The voltage $V_O$ at point 40 is, however, below the ionization potential of voltage sensitive neon tube switch 43. Tube 43 remains nonconducting and capacitor 42 does not charge. There is, therefore, no control voltage across this capacitor to drive switch 22 into conduction and pulse amplifier 44 of blanking switch 11 is in the operative condition ready to receive detected pulses 13.

Upon the appearance of the first detected pulse 13, a negative blanking pulse 45 is applied to the control grid 25 of pentode 23 biasing it to cut-off. The potential at the anode of pentode 23 rises towards the voltage at the B+ terminal and capacitor 38 begins to charge through resistance 34 from the base level voltage $V_B$ towards this value of voltage. The R–C charging time constant for capacitor 38 is greater, about twice as large, for example, than the blanking pulse duration so that the voltage on capacitor 38 does not rise to the B+ voltage, but to some intermediate value $V_i$. The potential at point 40 also increases (i.e., $V_O=V_i-V_K$) but not sufficiently to exceed the ionization potential of glow tube 43. Upon termination of the negative blanking pulse, pentode 23 again conducts and the potential at its anode drops towards the base or reference level $V_B$. Capacitor 38 begins to discharge from $V_i$ towards this lower level through a discharge path comprising the cathode resistor 31, the plate resistance of pentode 23, and the inductance of tuned circuit 33. Since the plate resistance of a pentode is quite high, on the order of several hundred thousand ohms, the R–C discharge time for capacitor 38 is substantially greater than the R–C charging time for this capacitor. As a result, capacitor 38 discharges much more slowly than it charges and the rate at which the voltage across this capacitor decays is much lower than the rate at which the voltage is built up during the nonconducting state. At the appearance of the next blanking pulse, the voltage on capacitor 38 has not decayed back to the base level $V_B$ but to some higher value $V_B+V$. Pentode 23 is again driven to cut-off and the voltage at its anode rises towards B+. Capacitor 38 begins to charge from the new level $|V_B+V|$ towards the B+ voltage. Capacitor 38, therefore, charges up to a slightly higher intermediate value of voltage $$V'_i(V'_i>V_i)$$

Since capacitor 38 is only partially discharged in the interval between blanking, the degree of discharge and hence the average intermediate voltage level $V_{i_{av}}$ on capacitor 38 is a function of the time interval between blanking of pentode 23. Similarly, the potential at point 40 varies in accordance with the variations of the average voltage level on capacitor 38 differing therefrom only by the constant voltage drop across neon device 41. As long as the rate at which pentode 23 is blanked is less than a predetermined value, capacitor 38 discharges sufficiently so that the corresponding voltage at point 40 is insufficient to exceed the ionization potential of the voltage sensitive neon switch 43.

As long as voltage sensitive neon switch 43 does not conduct, control capacitor 42 is not charged and the solid state switch 22 remains deenergized and blanking circuit 11 continues to blank the R.F. amplifier 16. If the rate at which amplifier 16 is blanked exceeds a predetermined value, however, the average level on capacitor 38, $V_{i_{av}}$, and hence the voltages at points 39 and 40 increase with successive pulses until voltage at point 40 is sufficiently high to exceed the ionization potential of tube 43, causing the tube to conduct. Capacitor 42 charges up to a positive voltage level equal to the potential at point 40 less the voltage drop across neon tube 43. This voltage is sufficient to drive transistor 59, forming part of switch 22, into saturation, short circuiting any subsequent incoming detected pulses 13 to ground and preventing their application to the control grid of pulse amplifier 44. As a result, no blanking pulses are applied to pentode 23 and capacitor 38 begins to discharge. After a certain time, capacitor 38 has discharged sufficiently so that the voltage at point 40 falls below the extinction potential of neon tube 43 thereby terminating conduction and terminating further charging of capacitor 42. Storage capacitor 42 is extremely small, in the order of ten (10) or twenty (20) picofarads, and the base current of transistor 59 rapidly discharges the capacitor through current limiting resistor 63. The positive voltage at base 62, therefore, decays rapidly and transistor 59 becomes nonconducting. Blanking switch 11 is placed in an operative condition to produce blanking pulse 45 in response to the next pulse 13.

If the rate at which the R.F. amplifier is being blanked is still excessive, the following pulse or two again charges capacitor 38 up sufficiently so that the voltage at point 40 exceeds the ionization potential of neon switch 43 causing it to break down and again activate solid state switch 22 and preventing any further blanking pulses from being applied to the R.F. amplifier for a fixed period of time. The circuit will, in this fashion, continue to sample and sense the conditions at the output of R.F. amplifier 16 until the conditions which cause the excessive blanking are no longer present.

The time constants of the various R–C circuits in the detecting-sensing means of switch control circuit 12 are so proportioned that each time neon switch 43 breaks down to produce the control voltage which actuates solid state switch 22, the interval during which blanking switch 11 is disabled is sufficiently large to prevent the R.F. amplifier from being blanked excessively. That is, the various time constants may be adjusted in such a manner that in no eventuality can the R.F. amplifier 16 be blanked more than a given percentage of the time. For example, the circuit components may be adjusted so that the R.F. amplifier can, under no circumstances, be blanked no more than 30%–40% of the time. It will be apparent that the circuit arrangement illustrated in FIG. 2 is one of great flexibility which may be adjusted to function under various circumstances and to maintain the receiver operative in varying environments and under various conditions.

Although the circuit arrangement described above is effective to disable the noise blanking channel whenever the noise impulse rate is sufficiently high to cause excessive blanking of the receiver, the system is flexible enough to permit blanking of a burst of closely spaced noise impulses provided that the burst is of sufficiently short duration. That is, since capacitor 38 takes a finite period of time to charge up to a value of voltage such that the reduced voltage at point 40 exceeds the ionization potential of neon tube 43; a period of time which is a function of the rate at which R.F. amplifier 16 is blanked, a burst of closely spaced noise impulses will cause the capacitor to charge rapidly towards the critical voltage level. If the burst of impulses is of short duration and terminates before the voltage rises sufficiently, the disabling circuit is not actuated. Thus even though the impulse rate may have been very high over this interval, if the interval is short enough the disabling circuit is not actuated. If on the other hand the interval of closely spaced impulses is greater than a predetermined duration (a duration which is determined by the R–C charging and discharging times), the blanking circuit is disabled. It is, therefore, clear that the present circuit arrangement is one of great flexibility since it will permit the blanking circuit to blank out noise impulses at a very high rate for a very short time but will not permit such high blanking rate on anything approaching a steady state basis.

The following component values have been utilized in a circuit constructed in accordance with FIG. 2, and although these component values are not to be considered as limiting, a circuit utilizing these values proved satisfactory in operation:

| | |
|---|---|
| Capacitor 15 | .1 microfarad. |
| Pentode 23 | 6BH6. |
| Capacitor 26 | 5 picofarads. |
| Resistance 31 | 220 ohms. |
| Capacitor 32 | .001 microfarad. |
| Resistance 34 | 22,000 ohms. |
| Capacitor 35 | .001 microfarad. |
| Resistance 36 | 7500 ohms. |
| Capacitor 38 | .001 microfarad. |
| Neon glow tube 41 | G.E. NE–2. |
| Capacitor 42 | 22 picofarads. |
| Neon glow tube 43 | G.E. NE–2. |
| Triode 46 | ½ of 12AX7. |
| Resistor 50 | 47,000 ohms. |
| Resistor 51 | 1800 ohms. |
| Resistor 52 | 200 ohms. |
| Resistor 53 | 100,000 ohms. |
| Capacitor 54 | 180 picofarads. |
| Resistor 55 | 220,000 ohms. |
| Diode 56 | Hughes HD 4418. |
| Diode 57 | Hughes HD 6226. |
| Transistor 59 | G.E. 2N706. |
| Resistor 63 | 300,000 ohms. |

It will be apparent from the foregoing description that a new and novel communication receiver has been described which is particularly useful in mobile radio service and which includes a simple, effective circuit arrangement for disabling the noise blanking channel of the receiver whenever the rate at which one of the stages in the main receiver transmission channel is blanked becomes excessive.

While a particular embodiment of this invention has been shown, it will, of course, be understood that the invention is not limited thereto, since many modifications both in the circuit arrangement and in the instrumentalities employed may be made. It is contemplated by the appended claims to cover any such modifications which fall within the true spirit and scope of this invention.

What is claimed as new and desired to be secured by Letters Patent is:

1. In a communication receiver the combination comprising a signal transmission path having a plurality of stages for amplifying, converting, and detecting the received signal and for reproducing the retrieved intelligence obtained at the output of the detecting stage, circuit means for interrupting transmission in said path to prevent transmission of noise impulses including means to detect such noise impulses, means responsive to said detected impulses to form discrete control pulses, means to apply said pulses to at least one of the stages of said transmission path to vary the conduction thereof for the duration of said discrete control pulses thereby to prevent passage of said noise impulses, and means for disabling said interrupting circuit in response to the change in operating conditions at said interrupted stage whenever the rate at which said stage is interrupted exceeds a predetermined level, said last named means including means for sensing the change in operating parameters at said interrupted stage in response to each pulse to produce a control signal proportional to the rate of interruption, means coupling said control signal to said interrupting circuit to disable said circuit when said control signal exceeds a predetermined level.

2. In a communication receiver according to claim 1 wherein said disabling means includes switch means operative in response to said control signal for disabling said interrupting circuit.

3. In a communication receiver according to claim 1, wherein said sensing means includes a storage capacitor coupled to said interrupted stage which charges in response to changes in the operating parameters of said stage as it changes between the interrupted and uninterrupted states, the value of voltage to which said storage capacitor charges being proportional to the rate at which said stage is blanked.

4. In a communication receiver the combination comprising a signal transmission path having a plurality of stages for amplifying, converting, and detecting the received signal and for reproducing the retrieved intelligence obtained at the output of the detecting stage, circuit means for interrupting transmission in said path to prevent transmission of noise impulses including means to detect such noise impulses, means responsive to said detected impulses to form discrete control pulses, means to apply said pulses to at least one of the stages of said transmission path prior to detection of the received signal to bias said stage into cut-off for the duration of said discrete control pulses thereby to prevent passage of said noise impulses, and means for disabling said interrupting circuit in response to the change in operating conditions of said stage from the conducting to the cut-off state whenever the rate at which said stage is interrupted exceeds a predetermined level, said last named means including means coupled to said interrupted stage for sensing changes in the supply voltages as said stage changes between the cut-off and the conducting state, said last named means including a storage capacitor which charges to the value of the supply voltage during the cut-off state through one conducting path and discharges through a different conducting path during the conducting state, the time constants of said paths being different whereby said capacitor charges to an average voltage lying intermediate the value of supply voltage in the cut-off and conducting states, the level of said average voltage being proportional to the rate at which said stage is interrupted, and means for actuating said disabling means whenever said average voltage reaches a predetermined level to terminate formation of said control pulses.

5. A communication receiver according to claim 4 wherein said sensing means includes a voltage sensitive switch coupled to said storage capacitor which becomes conductive whenever the voltage on said capacitor exceeds a predetermined level thereby actuating said disabling means and terminating formation of said control pulses.

6. A communication receiver according to claim 5 including a further capacitor coupled to said voltage sensitive switch which charges up whenever said switch conducts to product a control voltage which actuates said disabling means.

7. A communication receiver according to claim 6 wherein said voltage sensitive switch comprises a gaseous discharge device.

8. A communication receiver according to claim 6 wherein a voltage reference element is coupled between said storage capacitor and said voltage sensitive switch for producing a fixed voltage drop whereby the voltage impressed on said switch varies in synchronism with the average voltage on said storage capacitor but at a lower value.

9. A communication receiver according to claim 8 wherein said voltage reference element is a gaseous discharge device having a fixed voltage drop thereacross.

10. In a communication receiver the combination comprising a signal transmission path including radio frequency amplifying stages for amplifying the received signal, at least one frequency converting stage for converting the frequency of said received signal, detecting means for retrieving the intelligence from said signal, and reproducing means for reproduction of said retrieved intelligence, a blanking circuit for biasing one of said radio frequency amplifying stages into cut-off in response to noise impulses to prevent transmission of said noise impulses through said receiver, including means for detecting such noise impulses, means responsive to said detected impulses for forming discrete blanking pulses, means to apply said blanking pulses to at least one of said radio frequency amplifying stages to bias said stage into nonconduction to prevent passage of said noise impulses, means for disabling said blanking circuit in response to the change in operating conditions of said amplifying stages when said stage changes from the conducting to the nonconducting state whenever the rate at which said amplifying stage is blanked exceeds a predetermined level, said last named means including means to sense the change in voltage levels in said amplifier stage as it changes between the cut-off and conducting states for producing a control voltage which is proportional to the rate at which said amplifier stage is blanked, means coupling said control voltage to said blanking circuit to disable said circuit and terminate formation of said blanking pulses whenever said control voltage exceeds a predetermined value.

References Cited in the file of this patent

UNITED STATES PATENTS

| | | |
|---|---|---|
| 2,085,448 | Ponsot et al. | June 29, 1937 |
| 2,948,808 | Neumann et al. | Aug. 9, 1960 |